United States Patent [19]

Takehara

[11] Patent Number: 5,357,016
[45] Date of Patent: Oct. 18, 1994

[54] PREPARATION AND PROCESSING OF POLYDIORGANOSILOXANES

[75] Inventor: Donald K. Takehara, Midland, Mich.

[73] Assignee: Dow Corning Corporation, Midland, Mich.

[21] Appl. No.: 122,967

[22] Filed: Sep. 20, 1993

[51] Int. Cl.$^5$ .............................................. C08G 77/08
[52] U.S. Cl. ...................................... 528/14; 528/15; 528/23; 528/37
[58] Field of Search .................... 528/23, 37, 14, 15

[56] References Cited

U.S. PATENT DOCUMENTS

| 4,005,023 | 1/1977 | Brown, Jr. et al. | 252/78.3 |
| 4,599,437 | 7/1986 | Riederer | 528/23 |
| 4,888,405 | 12/1989 | Gamon et al. | 528/23 |

OTHER PUBLICATIONS

The Chemical Society of Japan, 1986: "Solid Acid–Catalyzed Allylation of Acetals and Carbonyl Compounds with Allylic Silanes" pp. 381–384, by Kawai, Onaka, and Izumi.

Applied Clay Science, 1987; "Synthetic Organic Chemistry Using Pillared, Cation-Exchanged and Acid--Treated Montmorillonite Catalysts-A Review"; pp. 309–342. by J. M. Adams.

Primary Examiner—Marquis, Melvyn I.
Attorney, Agent, or Firm—Sharon K. Severance

[57] ABSTRACT

The instant invention pertains to a method for producing polydiorganosiloxanes wherein the method comprises contacting (A) at least one organosilicon compound having in the molecule at least one silanol group and/or (C) triorganosilyl endblocker and (D) a diorganocyclicsiloxane with (B) a cation exchanged acid treated montmorillonite clay. The polydiorganosiloxanes produced by the method of this invention have less branching along the siloxane chain than those polydiorganosiloxanes produced by other methods.

23 Claims, No Drawings

PREPARATION AND PROCESSING OF POLYDIORGANOSILOXANES

BACKGROUND OF THE INVENTION

Polydiorganosiloxanes are generally produced by polymerizing a diorganosiloxane such as hydroxyl endblocked dimethyl fluids, dimethyl cyclicsiloxanes, phenylmethyl siloxanes, and others in the presence of a triorganosilyl endblocker. One typical catalyst for this reaction is an acid such as an acid treated montmorillonite clay. For example, U.S. Pat. No. 4,005,023 to Brown and Traver describes linear hydraulic silicone fluids having 2 to 2,000 silicon atoms in the polymer chain. The linear hydraulic silicone fluids can be produced by several methods. One of the methods described comprises equilibrating a silicone fluid (produced from hydrolysis of organohalosilanes) using an acid-treated clay. Another method comprises polymerizing cyclicsiloxanes and mono-functional compounds using an acid catalyst such a FILTROL (an acid clay).

While the acid treated montmorillonite catalyst is effective in producing the polydiorganosiloxane it also creates undesired branching along the polydiorganosiloxane molecule.

Further, U.S. Pat. No. 4,888,405 to Gamon et al., discloses a method for treating organocyclosiloxanes with an acid treated montmorillonite catalyst to reduce hydroxyl content and thus producing organocyclosiloxane-containing mixtures which are suitable as starting materials for silicones having reproducible viscosities. The catalysts employed by Gamon include acid activated bleaching earths and zeolites. Gamon teaches that the catalyst condenses the silanol while the equilibration of the cyclics occurs only to a very small extent.

Although it is fairly well known in the art that acid treated montmorillonite clays may be used to produce certain silicones, the use of cation exchanged acid treated montmorillonite clays in tile production or treatment of polydiorganosiloxanes is relatively unknown. "Solid Acid-Catalyzed Allylation of Acetals and Carbonyl Compounds with Allylic Silanes", Chem. Lett., 1986, (3), 381–384, to Kawai et al. discloses the use of an aluminum cation or proton exchanged montmorillonite to catalyze the reaction between allylic silanes and carbonyl compounds.

It is an object of this invention to show the use of a cation exchanged acid treated montmorillonite clay in the production of polydiorganosiloxanes.

It is further an object of this invention to show the use of a cation exchanged acid treated montmorillonite clay in the production of polydiorganosiloxanes wherein the clay is effective at catalyzing the polymerization of an organosilicon compound having in the molecule at least one silanol group and a triorganosilyl endblocker.

It is further an object of this invention to show the use of a cation exchanged acid treated montmorillonite clay in the production of polydiorganosiloxanes wherein the clay is effective at catalyzing the polymerization of an organosilicon compound having in the molecule at least one silanol group and a diorganocyclicsiloxane.

It is further an object of this invention to show the use of a cation exchanged acid treated montmorillonite clay in the production of polydiorganosiloxanes wherein the clay is effective at catalyzing the polymerization of a diorganocyclicsiloxane and a triorganosilyl endblocker.

SUMMARY OF THE INVENTION

The instant invention pertains to a method for producing polydiorganosiloxanes wherein the method comprises contacting (A) at least one organosilicon compound having in the molecule at least one silanol group with (B) a cation exchanged acid treated montmorillonite clay. In addition to the organosilicon compound having in the molecule at least one silanol group there may be present in the reaction mixture (C) a triorganosilyl endblocker and/or (D) a diorganocyclicsiloxane. The polydiorganosiloxanes produced by the method of this invention have less branching along the siloxane chain than those polydiorganosiloxanes produced by other methods.

The instant invention further pertains to a method for producing polydiorganosiloxanes wherein the method comprises contacting a mixture comprising (C) a triorganosilyl endblocker and (D) a diorganocyclicsiloxane with (B) a cation exchanged acid treated montmorillonite clay.

THE INVENTION

The instant invention pertains to a method for the production of polydiorganosiloxanes wherein the method which comprises contacting (A) at least one organosilicon compound having in the molecule at least one silanol group the remaining substituents being silicon bonded organic substituents wherein the silicon-bonded organic substituents are selected from the group consisting of monovalent hydrocarbon groups having from 1 to 14 carbon atoms and monovalent substituted hydrocarbon groups having from 1 to 10 carbon atoms in which the substituents are selected from halogen, mercapto, hydroxyl, and ester, with (B) a cation exchanged acid treated montmorillonite clay.

The process of this invention may be applied in the production of condensation products of any type of organosilicon compound having at least one silanol (hereinafter referred to as —OH containing organosilicon compound), that is —SiOH, group in the molecule. Thus, the —OH containing organosilicon compound may be an organosilane, organosiloxane, or silcarbane or mixtures of the same type or of different types of such organosilicon compounds. The silicon-bonded organic substituents in the —OH containing organosilicon compound may be monovalent hydrocarbon groups having from 1 to 14 carbon atoms, for example alkyl, aryl, aralkyl, alkaryl, or alkenyl groups or monovalent substituted hydrocarbon groups having from 1 to 10 carbon atoms for example mercaptoalkyl groups, haloalkyl groups, esterified carboxyalkyl groups and hydroxyalkyl groups. Specific examples of the organic substituents which may be present in the —OH containing organosilicon compounds employed in the process of this invention are methyl, ethyl, propyl, hexyl, dodecyl, tetradecyl, phenyl, xylyl, tolyl, phenylethyl, vinyl, allyl, hexenyl, —RSH, —RBr, —RCl and —ROH wherein R represents a divalent organic group, preferably having less than 8 carbon atoms for example alkylene such as —(CH$_2$)$_3$— and —CH$_2$CHCH$_3$CH$_2$—, arylene such as —C$_6$H$_4$— or aralkylene such as —(C$_6$H$_4$CH$_3$)—. For the majority of commercial applications at least 50% of the organic substituents will be methyl, any remaining substituents being selected from vinyl and phenyl. Preferably at least 90% and more preferably all of the organic substituents will be methyl.

The preferred —OH containing organosilicon compounds are linear silanol-terminated polydiorganosiloxanes represented by the general formula

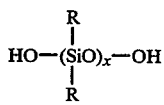

wherein R is a monovalent hydrocarbon radical having from 1 to 6 carbon atoms, preferably methyl and x has a value of 1 to 2,000, preferably from 1 to 150 and most preferably from 1 to 100.

In addition to the —OH containing organosilicon compound there may also be present (C) a triorganosilyl endblocker having a radical of the formula $R^1_3Si$— wherein each $R^1$ is a hydrocarbon radical having 1 to 6 carbon atoms. $R^1$ can be, for example methyl, ethyl, propyl, phenyl, vinyl and others. The source of the triorganosilyl endblocker radicals can be any material which under reaction conditions forms the triorganosilyl radical of the formula $Rl_3Si$—. By adding a triorganosilyl endblocker the polymer length of the product polydiorganosiloxane can be controlled.

Examples of triorganosilyl endblockers useful in the instant invention include, but are not limited to, hexamethyldisiloxane, trimethyl endblocked linear polydimethylsiloxanes, and others.

The amount of triorganosilyl endblocker useful is from about 0.1 to 25 weight percent of the reaction mixture. It is preferred that the triorganosilyl endblocker be present in a concentration of 0.1 to 5 weight of the reaction mixture. The reaction mixture, as used herein, refers to the amount of all silicone reactants (—OH containing organosilicon compounds, diorganocyclicsiloxanes, triorganosilyl endblocker, etc.) present in the system.

Additionally there may also be present with the —OH containing organosilicon compound (D) a diorganocyclicsiloxane wherein the diorganocyclicsiloxane is capable of polymerizing with the —OH containing organosilicon compound in the presence of the cation exchanged acid treated montmorillonite clay. The diorganocyclicsiloxanes useful in the instant invention may be of the formula

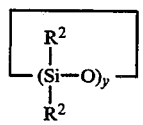

wherein each $R^2$ is independently selected from a monovalent hydrocarbon groups having from 1 to 14 carbon atoms, monovalent substituted hydrocarbon groups having from 1 to 10 carbon atoms and the hydrogen atom; and y has a value of 4 to 6. Examples of useful diorganocyclicsiloxanes include, but are not limited to, dimethyl cyclicsiloxanes, phenylmethyl cyclicsiloxanes and others.

The amount of diorganocyclicsiloxane useful in the instant invention is from 0.1 to 75 weight percent of the reaction mixture, preferably from 10 to 60 weight percent.

The instant invention further pertains to a method for producing polydiorganosiloxanes wherein the method comprises contacting a mixture comprising (C) a triorganosilyl endblocker and (D) a diorganocyclicsiloxane with (B) a cation exchanged acid treated montmorillonite clay. The diorganocyclicsiloxanes and triorganosilyl endblockers useful are those previously exemplified for inclusion with the —OH containing organosilicon compound. The amount of triorganosilyl endblocker useful is from about 0.1 to 25 weight percent of the diorganocyclicsiloxane.

The organosilicon reactant, (A), (A)/(C), (A)/(D), (A)(C)(D) or (C)/(D), is contacted with a cation exchanged acid treated montmorillonite clay. The cation exchanged acid treated montmorillonite clay comprises an acid treated montmorillonite clay which is cation exchanged with a cation such as $Fe^{3+}$, $Ca^{2+}$, $Mg^{2+}$, $Na^+$, $K^+$ and others.

The cation exchanged acid treated montmorillonite clays useful in the instant invention are known in the art or may be produced by methods known in the art. For example "Synthetic Organic Chemistry Using Pillared, Cation Exchanged and Acid-Treated Montmorillonite Catalysts—A Review" by J. Adams, Applied Clay Science, (1987) 309–342, teaches a method for producing cation exchanged acid treated montmorillonite clays. The method comprises exposing a montmorillonite to salt solution of concentration between 0.5 and 1.0 mol $dm^{-3}$ for approximately 24 hours. The clay is then centrifuged and resuspended in deionized water repetitively, isolated by centrifugation, dried in an oven at 40° to 50° C. and then finely ground.

The amount of catalyst employed must be sufficient to achieve the desired rate of polymerization having regard to the nature and geometry of the processing equipment, temperature and other factors It is preferred to use from about 0.001 to 5% of the catalyst based on the weight of the reaction mixture.

The process of this invention involves contacting the organosilicon reactant with the catalyst (B) at a temperature at which the desired rate of molecular weight increase occurs. The reaction is typically carried out at temperature of 0° C. to 200° C., preferably from 10° C. to 150° C. The temperature employed depends on the organosilicon compound being employed. The reaction times will vary according to equipment and batch size. Typically reaction times of 5 minutes to 48 hours, and more preferably from 15 minutes to 5 hours, are employed. The method for producing polydiorganosiloxanes according to the instant invention with the cation exchanged acid treated montmorillonite clays can be carried out at atmospheric pressure as well as at pressures above or below atmospheric pressure.

The reaction may be run on a continuous, semi-continuous, or batch reactor. A continuous reactor comprises a means wherein the reactants are introduced and products are withdrawn simultaneously. The continuous reactor may be a tank, a tubular structure, a tower, or some other like structure, the overall design not being essential. The preferred continuous reactor is a fixed bed reactor. A semi-continuous reactor comprises a means wherein some of the reactants are charged at the beginning and the remaining are fed continuously as the reaction progresses. The product may optionally be simultaneously withdrawn from the semi-continuous reactor. A batch reactor comprises a means wherein all the reactants are added at the beginning and processing is carried out according to a predetermined course of reaction during which no reactant is fed into or removed from the reactor. Typically a batch reactor will be a tank with or without agitation means.

The method of this invention produces low silanol polydiorganosiloxanes that are stable and relatively inert. Further the method of this invention produces a polydiorganosiloxane fluid containing low branching which helps prevent gellation of the polydiorganosiloxane fluid and reduce variation in the viscosity of the polydiorganosiloxane fluid. The branching of the polydiorganosiloxanes is typically less than that which occurs with other catalyst systems.

So that those skilled in the art can understand and appreciate the invention taught herein, the following examples are presented, it being understood that these examples should not be used to limit the scope of this invention over the limitations found in the claims attached hereto.

Method for Treatment

The following examples were conducted in a 2L flask with constant, vigorous agitation under a nitrogen purge at 150° C. and atmospheric pressure. 1,000 grams of the starting material was charged into the flask and heated to 150° C. 35cc of 20 to 35 mesh catalyst was then added to the flask. Samples were taken periodically with a syringe through a septum. The samples were analyzed to determine the hydroxyl content (ppm) and monomethyl branching content (ppm) in the samples.

Samples were analyzed for hydroxyl content and monomethyl branching both prior to and following the reaction. In Examples 1, 2 and Comparative A hydroxyl content (silanol) was measured by titrating a 0.1 to 0.5 gram sample of the polysiloxane with 0.1 to 0.2 N solution of lithium aluminum areida. In Examples 3, 4, 5, Comparative B and C hydroxyl content (silanol) was measured by infrared spectroscopy according to ASTM E-168. Quantitative measurements were made by comparing the absorbance of a specific band in the infrared spectrum with the absorbance of the same band in a reference spectrum obtained after deuterating the sample. The sample was deuterated by exposing the sample to $D_2O$. This deuteration converted the —SiOH to —SiOD. Thus, a sample with no silanol was created which was used to obtain a reference spectrum with no silanol. In all examples, monomethyl branching content was determined by gas chromatography (ASTM E-180). The sample was first reacted with tetraethoxysilane in the presence of a base catalyst to yield the corresponding ethoxysilane derivatives. Following the reaction the sample was made neutral with $CO_2$. The sample was then analyzed for monomethyl content to 25 ppm by gas chromatography.

EXAMPLE 1

A polydimethylsiloxane containing approximately 12% by weight of cyclicsiloxanes having a viscosity of approximately 175 centistoke, and having a dp of approximately 120 was used in this experiment. The polydimethylsiloxane contained 500 ppm of silanol and 900 ppm of monomethyl branching. The polydimethylsiloxane was treated according to the above method using a $Mg^{+2}$ exchanged $H_2SO_4$ activated montmorillonite clay supplied by Engelhard Corporation. After 180 minutes the resulting polydimethylsiloxane had a silanol content of 200 ppm and the monomethyl branching remained constant at 900 ppm.

EXAMPLE 2

A polydimethylsiloxane containing approximately 12% by weight of cyclicsiloxanes having a viscosity of approximately 175 centistoke, and having a dp of approximately 120 was used in this experiment. The polydimethylsiloxane contained 600 ppm of silanol and 800 ppm of monomethyl branching. The polydimethylsiloxane was treated according to the above method using a $Ca^{+2}$ exchanged $H_2SO_4$ activated montmorillonite clay supplied by Engelhard Corporation. After 180 minutes the resulting polydimethylsiloxane had a silanol content of 350 ppm and the monomethyl branching remained constant at 800 ppm.

COMPARATIVE EXAMPLE A

A polydimethylsiloxane containing approximately 12% by weight of cyclicsiloxanes having a viscosity of approximately 175 centistoke, and having a dp of approximately 120 was used in this experiment. The polydimethylsiloxane contained 500 ppm of silanol and 800 ppm of monomethyl branching. The polydimethylsiloxane was treated according to the above method using FILTROL 24 (R) ($H_2SO_4$ activated montmorillonite clay) manufactured by Engelhard Corporation. After 180 minutes the resulting polydimethylsiloxane had a silanol content of 100 ppm and the monomethyl branching had increased to 3000 ppm.

EXAMPLE 3

A polydimethylsiloxane containing approximately 12% by weight of cyclicsiloxanes having a viscosity of approximately 175 centistoke, and having a dp of approximately 120 was used in this experiment. The polydimethylsiloxane contained 1500 ppm of silanol and containing 600 ppm of monomethyl branching. The polydimethylsiloxane was treated according to the above method with a $Mg^{+2}$ exchanged HCl activated montmorillonite clay supplied by Engelhard Corporation. After 110 minutes the resulting polydimethylsiloxane had a silanol content of 100 ppm and the monomethyl branching remained constant at 600 ppm.

EXAMPLE 4

A polydimethylsiloxane containing approximately 12% by weight of cyclicsiloxanes having a viscosity of approximately 175 centistoke, and having a dp of approximately 120 was used in this experiment. The polydimethylsiloxane contained 1500 ppm of silanol and containing 600 ppm of monomethyl branching. The polydimethylsiloxane was treated according to the above method with a $Fe^{+3}$ exchanged HCl activated montmorillonite clay manufactured by Engelhard Corporation. After 110 minutes the resulting polydimethylsiloxane had a silanol content of 100 ppm and a monomethyl branching of 3500 ppm.

COMPARATIVE EXAMPLE B

A polydimethylsiloxane containing approximately 12% by weight of cyclicsiloxanes having a viscosity of approximately 175 centistoke, and having a dp of approximately 120 was used in this experiment. The polydimethylsiloxane contained 1500 ppm of silanol and containing 600 ppm of monomethyl branching. The polydimethylsiloxane was treated according to the above method with an HCl activated montmorillonite clay supplied by Engelhard Corporation. After 120 minutes, the resulting polydimethylsiloxane had a silanol content of 120 ppm and a monomethyl branching of 3000 ppm.

EXAMPLE 5

1,000 grams of a mixture comprising 35 weight % of dimethyl cyclic siloxanes, 60 weight % of a silanol endblocked linear polydimethylsiloxane (containing approx. 1% silanol, dP=20 to 45), and 5 weight % trimethyl endblocked linear polydimethylsiloxane (approx. 30% Me$_3$SiO$_{\frac{1}{2}}$, dP=7) was combined with 30 cc of 20×35 mesh particles of Mg+2 $_{exchanged\ HCl}$ montmorillonite clay. After 120 minutes at 150° C. polydimethylsiloxane having a average molecular weight of 10,200 and a silanol content of 1400 ppm was produced. 100 grams of hexamethyldisiloxane was then added to the reaction mixture. After 120 minutes at 150 ° C. the result was a polydimethylsiloxane having a molecular weight of approximately 3600. GPC confirmed that the hexamethyldisiloxane was rearranged and incorporated into the polymer.

COMPARATIVE EXAMPLE C 1,000 grams of a mixture comprising 35 weight % of cyclic siloxanes, 60 weight % of a silanol endblocked linear polydimethylsiloxane (containing approx. 1% silanol, dP=20 to 45), and 5 weight percent trimethyl endblocked linear polydimethylsiloxane (approx. 30% Me$_3$SiO$_{\frac{1}{2}}$, dP=7) was combined with 30 cc of 20×35 mesh parts of TONSIL COG produced by Sud Chemie. After 120 minutes at 150° C. a polydimethylsiloxane having a weight average molecular weight of 11,500 and a silanol content of 1,100 was produced. 100 grams of Hexamethyldisiloxane was then added to the reaction mixture. After 120 minutes at 150° C. the result was a polydimethylsiloxane having an average molecular weight of 3,300. GPC confirmed that the hexamethyldisiloxane was rearranged and incorporated into the polymer.

WHAT IS CLAIMED IS:

1. A method for the production of polydiorganosiloxanes wherein the method which comprises contacting a reaction mixture
   (A) at least one organosilicon compound having in the molecule at least one silanol group the remaining substituents being silicon bonded organic substituents wherein the silicon-bonded organic substituents are selected from the group consisting of monovalent hydrocarbon groups having from 1 to 14 carbon atoms and monovalent substituted hydrocarbon groups having from 1 to 10 carbon atoms in which the substituents are selected from the group consisting of halogen, mercapto, hydroxyl, and ester, with
   (B) a cation exchanged acid treated montmorillonite clay.

2. A method as claimed in claim 1 wherein the organosilicon compound (A) is a linear silanol-terminated polydiorganosiloxane.

3. A method as claimed in claim 1 wherein the cation exchanged acid treated montmorillonite clay is employed in an amount from 0.1 to 5% by weight based on the weight of the reaction mixture.

4. A method as claimed in claim 1 wherein the reaction is carried out at a temperature of 0° C. to 200° C.

5. A method as claimed in claim 1 wherein at least 90 mol % of the organic substituents in (A) are methyl.

6. A method as claimed in claim 1 wherein there is additionally present in the reaction mixture (C) a triorganosilyl endblocker containing a radical of the formula R$^1_3$Si— wherein each R$^1$ is independently a hydrocarbon radical having from 1 to 6 carbon atoms.

7. A method as claimed in claim 6 wherein the triorganosilyl endblocker is present in amount of 0.1 to 25 weight % of the reaction mixture.

8. A method as claimed in claim 1 wherein there is additionally present in the reaction mixture (D) a diorganocyclicsiloxane.

9. A method as claimed in claim 6 wherein the diorganocyclicsiloxane is present in an amount of 0.1 to 75 weight percent of the reaction mixture.

10. A method as claimed in claim 1 wherein the cation exchanged acid treated montmorillonite clay is a Mg$^{2+}$ exchanged acid treated montmorillonite clay.

11. A method as claimed in claim 1 wherein the cation exchanged acid treated montmorillonite clay is a Ca$^{2+}$ exchanged acid treated montmorillonite clay.

12. A method as claimed in claim 1 wherein the cation exchanged acid treated montmorillonite clay is a Fe$^{3+}$ exchanged acid treated montmorillonite clay.

13. A method as claimed in claim 1 wherein the cation exchanged acid treated montmorillonite clay is a Na$^+$ exchanged acid treated montmorillonite clay.

14. A method as claimed in claim 1 wherein the cation exchanged acid treated montmorillonite clay is a K$^+$ exchanged acid treated montmorillonite clay.

15. A method for the production of polydiorganosiloxanes wherein the method which comprises contacting a reaction mixture comprising
   (i) a diorganocyclicsiloxane and
   (ii) a triorganosilyl endblocker containing a radical of the formula R$^1_3$Si— wherein each R$^1$ is independently a hydrocarbon radical having from 1 to 6 carbon atoms;
with
   (iii) a cation exchanged acid treated montmorillonite clay.

16. A method as claimed in claim 15 wherein the cation exchanged acid treated montmorillonite clay is employed in an amount from 0.1 to 5% by weight based on the weight of the reaction mixture.

17. A method as claimed in claim 15 wherein the reaction is carried out at a temperature of 0° C. to 200° C.

18. A method as claimed in claim 15 wherein the triorganosilyl endblocker is present in amount of 0.1 to 25 weight % of the reaction mixture.

19. A method as claimed in claim 15 wherein the cation exchanged acid treated montmorillonite clay is a Mg$^{2+}$ exchanged acid treated montmorillonite clay.

20. A method as claimed in claim 15 wherein the cation exchanged acid treated montmorillonite clay is a Ca$^{2+}$ exchanged acid treated montmorillonite clay.

21. A method as claimed in claim 15 wherein the cation exchanged acid treated montmorillonite clay is a Fe$^{3+}$ exchanged acid treated montmorillonite clay.

22. A method as claimed in claim 15 wherein the cation exchanged acid treated montmorillonite clay is a Na$^+$ exchanged acid treated montmorillonite clay.

23. A method as claimed in claim 15 wherein the cation exchanged acid treated montmorillonite clay is a K$^+$ exchanged acid treated montmorillonite clay.

* * * * *